United States Patent [19]

Inoue

[11] Patent Number: 5,053,463

[45] Date of Patent: Oct. 1, 1991

[54] NITROGEN-CONTAINING ALKYD RESIN COATING COMPOSITION

[75] Inventor: Hiroshi Inoue, Hiratsuka, Japan

[73] Assignee: Kansai Paint Company, Limited, Hyogo, Japan

[21] Appl. No.: 378,352

[22] Filed: Jul. 7, 1989

[30] Foreign Application Priority Data

Jul. 13, 1988 [JP] Japan .................................. 63-174332

[51] Int. Cl.$^5$ .............................................. C08L 77/00
[52] U.S. Cl. ...................................... 525/427; 525/38; 525/420; 525/519
[58] Field of Search ...................... 525/427, 517.5, 519, 525/420, 444.5, 38, 167.5

[56] References Cited

U.S. PATENT DOCUMENTS 2,692,253  10/1952  Holmen .............................. 525/519
4,649,175   3/1987  Inoue et al. .......................... 525/38

Primary Examiner—John C. Bleutge
Assistant Examiner—D. Aylward
Attorney, Agent, or Firm—Armstrong, Nikaido, Marmelstein, Kubovcik & Murray

[57] ABSTRACT

The invention provides a nitrogen-containing alkyd resin coating composition comprising a nitrogen-containing alkyd resin prepared by reacting an amine compound containing at least two active hydrogen atoms in the molecule and having or not having one hydroxyl group in the molecule with a polyhydric alcohol and a polybasic acid using or without using a fatty acid, and a crosslinking agent.

3 Claims, No Drawings

NITROGEN-CONTAINING ALKYD RESIN COATING COMPOSITION

The present invention relates to a novel nitrogen-containing alkyd resin coating composition.

Alkyd resin coating compositions are known which consist essentially of a crosslinking agent and an alkyd resin or fatty acid-modified alkyd resin obtained by reaction of a polybasic acid and a polyhydric alcohol using or without using a fatty acid conjointly therewith. Such coating compositions are highly amenable to coating operation and inexpensive and are therefore widely used.

With the current rapid advance of technical innovations, higher standards are required of the properties of coating compositions. With the alkyd resin coating compositions, it is desired that the pigment be dispersible more effectively with higher stability to give coatings having an improved appearance on finishing in respect of gloss, distinctness-of-image gloss, etc. Further because the coatings of these compositions are generally still unsatisfactory in adhesion, resistances to corrosion and chemicals, flexibility and like properties, it has been strongly desired to improve these properties.

To provide alkyd resin coating compositions capable of fulfilling the foregoing requirements, we proposed to use a nitrogen-containing alkyd resin which has nitrogen atoms incorporated into its main skeleton chiefly via the ester linkage by using an alkanolamine having at least two hydroxyl groups partially or solely as the polyhydric alcohol component (U.S. Pat. No. 4,649,175).

However, it has been found that the proposed nitrogen-containing alkyd resin coating composition has the drawback of giving coatings likely to yellow due to heat, light or the like. Moreover, the coatings of the coating composition remain to be further improved in resistances to corrosion and acids because the alkanolamine is released in the coating by hydrolysis of ester linkage due to the presence of water, acidic substance, alkali substance or the like.

It is an object of the present invention to provide a novel nitrogen-containing alkyd resin coating composition capable of fully satisfying the foregoing property requirements and excellent in resistance to yellowing.

It is another object of the invention to provide a novel nitrogen-containing alkyd resin coating composition permitting the pigment to be better dispersible with higher stability and capable of giving coatings fully improved in adhesion, resistances to corrosion and chemicals (acids and alkalis), resistance to solvents, flexibility and the like and outstanding also in resistance to yellowing.

These and other objects of the present invention will become apparent from the following description.

According to the present invention, there is provided a nitrogen-containing alkyd resin coating composition comprising (A) a nitrogen-containing alkyd resin prepared by reacting an amine compound containing at least two active hydrogen atoms in the molecule and having or not having one hydroxyl group in the molecule with a polyhydric alcohol and a polybasic acid using or without using a fatty acid and (B) a crosslinking agent.

Our research shows the following. When an amine compound containing at least two active hydrogen atoms in the molecule and having or not having one hydroxyl group in the molecule is used in place of the alkanolamine having at least two hydroxyl groups as set out in U.S. Pat. No. 4,649,175, nitrogen atoms are introduced into the main skeleton of the alkyd resin by the amide linkage as well as the ester linkage, resulting in production of nitrogen-containing alkyd resin coating composition capable of giving coatings excellent in resistance to yellowing and pronouncedly improved in resistances to corrosion and acids due to the stability of amide linkage to hydrolysis.

The present invention has been accomplished based on this novel finding.

The nitrogen-containing alkyd resin (A) for use as the vehicle component in the coating composition of the invention consists essentially of a polybasic acid, a polyhydric alcohol and the above-specified amine compound and can be prepared by reacting these essential components and, when required, a fatty acid.

The polybasic acid for use herein is a polycarboxylic acid compound having at least two carboxyl groups in the molecule. Examples of such polycarboxylic acid compounds are aliphatic saturated dibasic acids such as succinic acid, adipic acid, azelaic acid, sebacic acid, dodecylsuccinic acid and anhydrides thereof, aliphatic unsaturated dibasic acids such as maleic acid, fumaric acid, itaconic acid and anhydrides thereof, aromatic polybasic acids such as phthalic acid, isophthalic acid, terephthalic acid, trimellitic acid, pyromellitic acid and anhydrides thereof, alicyclic polybasic acids such as tatrahydrophthalic acid, methylcyclohexenetricarboxylic acid, hexahydrophthalic acid, endomethylenephthalic acid, hexachloroendomethylenetetrahydrophthalic acid, tetrachlorophthalic acid, cyclohexanedicarboxylic acid, methylhexahydrophthalic acid, hexahydrotrimellitic acid and anhydrides thereof, etc. These compounds are usable singly or at least two of them can be used in mixture.

The polyhydric alcohol for use herein are ethylene glycol, diethylene glycol, triethylene glycol, propylene glycol, dipropylene glycol, butanediol, neopentyl glycol, 1,2-, 1,3-, 2,3-, 1,4-butylene glycol, pentanediol, 2,3-dimethylpropanediol, 1,6-, 2,5-hexanediol, hydrogenated bisphenol-A, cyclohexanedimethanol, trimethylene glycol, tatramethylene glycol, hexamethylene glycol, trimethylolethane, trimethylolpropane, glycerin, pentaerythritol, diglycerin, dipentaerythritol, sorbitol, etc. These alcohols are usable singly or at least two of them can be used in mixture.

According to the invention, the amine compound which is reacted with a polybasic acid along with a polyhydric acid has in the molecule at least two active hydrogen atoms, preferably about two to about six active hydrogen atoms, reactive with carboxyl group in the polybasic acid and may optionally have one hydroxyl group in the molecule. The term "active hydrogen atom" used herein is intended to denote an active hydrogen atom to be present in functional group such as $NH_2$ (primary amino group as in $C-NH_2$), OH, NH (secondary amino group as in $C-NH-C$), etc.

Preferred examples of the amine compound are amine compounds represented by the formula

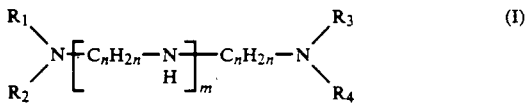

(wherein $R_1$, $R_2$, $R_3$ and $R_4$ are the same or different and each represent hydrogen atom, alkyl group, aryl group or cycloalkyl group, n is an integer of 1 to 4, and m is an integer of 0 to 4, provided that when m is 0, at least two of $R_1$, $R_2$, $R_3$ and $R_4$ are hydrogen atoms or that when m is 1, at least one of $R_1$, $R_2$, $R_3$ and $R_4$ is hydrogen atom) and having primary amino group and/or secondary amino group in the molecule (primary amine compounds or secondary amine compounds), and alkanolamine compounds represented by the formula

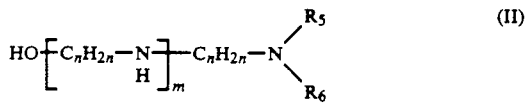

(wherein $R_5$ and $R_6$ are the same or different and each represent hydrogen atom, alkyl group, aryl group or cycloalkyl group, and n and m are as defined above, provided that when m is 0, at least one of $R_5$ and $R_6$ is hydrogen atom) and having one hydroxyl group and one primary amino group and/or secondary amino group in the molecule. At least one of these amine compounds is preferably used.

Examples of the alkyl group in the formulas (I) and (II) are methyl, ethyl, n-propyl, iso-propyl, n-butyl, iso-butyl, sec-butyl, tert-butyl, n-hexyl, 2-ethyl hexyl, lauryl, etc. among which $C_{1-4}$ lower alkyl is preferred. Preferable of cycloalkyl groups in the formulas (I) and (II) is cyclohexyl group. Examples of the aryl group are phenyl, toluyl, xylyl and the like.

Examples of the compounds of the formula (I) are $NH_2$―$(C_2H_4$―$NH)_2C_2H_4$―$NH_2$, $NH_2$―$C_3H_6$―$NH$―$C_3H_6$―$NH_2$, $C_2H_5$―$NH$―$C_3H_6$―$NH_2$, etc. $H$―$C_3H_6$―$NH_2$, $C_2H_5$―$NH$―$C_3H_6$―$NH_2$, etc.

Examples of the compounds of the formula (II) are $OH$―$CH_2$―$NH_2$, $OH$―$C_2H_4$―$NH_2$, $OH$―$CH_2$―$NH$―$CH_3$, $OH$―$C_2H_4$―$NH$―$CH_3$, $OH$―$C_2H_4$―$NH$―$C_2H_5$, $OH$―$C_2H_4$―$NH$―$C_3H_7$, $OH$―$C_2H_4$―$NH$―$C_2H_4CH_3$, $OH$―$C_2H_4$―$NH$―$C_4H_9$,

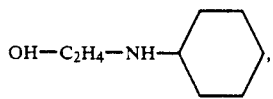

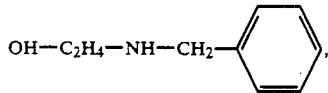

$OH$―$C_3H_6$―$NH_2$, $OH$―$C_3H_6$―$NH$―$CH_3$, $OH$―$C_3H_6$―$NH$―$C_2H_5$, $OH$―$C_3H_6$―$NH$―$C_3H_7$, $OH$―$C_3H_6$―$NH$―$C_2H_4CH_3$, $OH$―$C_3H_6$―$NH$―$C_4H_9$,

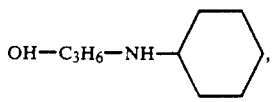

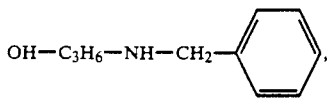

$OH$―$C_2H_4$―$NH$―$C_2H_4$―$NH_2$, $OH$―$(C_2H_4$―$NH)_2$―$C_2H_4$―$NH_2$,

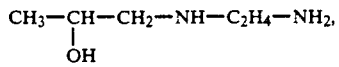

etc.

Of these examples, preferable are the compounds of the formula (II) and more preferable are the compounds having one OH group and at least one of NH group and $NH_2$ group in the molecule.

In the reaction the polybasic acid, polyhydric alcohol, amine compound and optional fatty acid are used in the following proportions based on the combined weight of these components. The ratio of the polybasic acid is about 10 to about 80% by weight, preferably about 15 to about 70% by weight, more preferably about 20 to about 50% by weight. The ratio of the polyhydric alcohol is about 5 to about 80% by weight, preferably about 10 to about 70% by weight, more preferably about 15 to about 60% by weight. The ratio of the amine compound is about 0.5 to about 55% by weight, preferably about 0.5 to about 40% by weight, more preferably about 1 to about 30% by weight. The ratio of the fatty acid is 0 to about 60% by weight, preferably about 5 to about 60% by weight, more preferably about 10 to about 60% by weight.

Examples of fatty acids to be used when required are fatty acids of drying or semidrying oils (at least about 100 in iodine value) or nondrying oils (less than 100 in iodine value), and these oils. Specific examples of the fatty acids of drying or semidrying oils are fatty acids of safflower oil, linseed oil, soybean oil, sesame oil, poppy seed oil, perilla oil, hemp seed oil, grape seed oil, corn oil, tall oil, sunflower oil, cotton seed oil, walnut oil, tung oil, dehydrated castor oil, rice bran oil and the like, these oils, dimer acids thereof, etc. Useful fatty acids of nondrying oils include a fatty acid of coconut oil, coconut oil and the like.

The nitrogen-containing alkyd resin (A) can be prepared by reacting a polybasic acid, a polyhydric alcohol and an amine compound with or without addition of fatty acid under the same conditions as employed for preparing usual alkyd resins, e.g. at about 150° to about 250° C. for about 1 to about 15 hours.

The coating composition of the present invention can be in the form of either a solution or dispersion of the organic solvent type formed using an organic solvent as a dispersant or a diluent, or an aqueous solution or dispersion which may contain a small amount of organic solvent. It is preferred to prepare the nitrogen-containing alkyd resin according to the form. Stated more specifically, preferred nitrogen-containing alkyd resins are those having a hydroxyl value of 0 to about 200, preferably about 30 to about 150, and an acid value of 0 to about 30 for the coating composition of the organic solvent type and those having a hydroxyl value of 0 to about 200, preferably about 30 to about 150, and an acid value of about 10 to about 200 for the aqueous coating composition.

In preparation of an aqueous coating composition, the nitrogen-containing alkyd resin is preferably adjusted to said acid value. For this purpose, it is desirable to introduce carboxyl group into the nitrogen-containing alkyd resin by the following method. For example, carboxyl group can be introduced into the resin by optimizing the reaction conditions for preparation of the nitrogen-containing alkyd resin or by performing the reaction using the polybasic acid in an amount sufficient to make present a larger amount of carboxyl group than hydroxyl group and amino group. Alternatively the introduction of carboxyl group can be done by mixing a nitrogen-containing alkyd resin having hydroxyl group with a carboxylic anhydride compound such as maleic anhydride, phthalic anhydride, itaconic anhydride, succinic anhydride or the like to react the hydroxyl group in the resin with the carboxylic anhydride group of the compound by half-esterification.

The nitrogen-containing alkyd resin coating composition of the invention contains (A) the nitrogen-containing alkyd resin and (B) the crosslinking agent. The crosslinking agent (B) is used to cure the resin (A) into a three-dimensionally reticular structure by crosslinking with or without heating. The crosslinking agent (B) is a resin or a compound having functional group (such as amino group, alkyl ether group, blocked or non-blocked isocyanate group) which group undergoes crosslinking reaction with the functional group such as $NH_2$, OH, NH or the like in the nitrogen-containing alkyd resin. Examples of useful crosslinking agents are a melamine resin, urea resin, benzoguanamine resin and these resins modified, e.g. methylolated and/or alkyl-etherified with at least one of monohydric alcohols (with 1 to 5 carbon atoms) and like amino resins and polyisocyanate compounds. Examples of useful polyisocyanate compounds are tolylene diisocyanate, adduct of tolylene diisocyanate and trimethylolpropane, diphenylmethane diisocyanate, methylene diisocyanate, hexamethylene diisocyanate, adduct of hexamethylene diisocyanate and trimethylolpropane, xylylene diisocyanate, lysine diisocyanate, etc. Examples of useful blocking agents are phenol, thiourea, methanol, propanol, n-butanol, tert-butanol, ethyl acetoacetate, dimethyl malonate, ,ϵ-caprolactam, etc.

The proportions of the nitrogen-containing alkyd resin and the crosslinking agent in the coating composition of the present invention are about 95 to about 60% by weight, preferably about 85 to about 70% by weight, of the former and about .5 to about 40% by weight, preferably about 15 to about 30% by weight, of the latter, based on the combined weight of these two components.

The present invention includes the following coating composition. When the nitrogen-containing alkyd resin coating composition of the invention is prepared by modifying the nitrogen-containing alkyd resin with at least one of fatty acids of drying oil and semidrying oil and these oils, the coating of the coating composition can be cured without use of crosslinking agent. In this case, the amount of the fatty acid to be used is about 10 to about 60% by weight (inclusive of at least 10% by weight of at least one of fatty acids of drying oil and semidrying oil and these oils), preferably at least about 15 to about 60% by weight (inclusive of at least about 15% by weight of at least one of fatty acids of drying oil and semidrying oil and these oils), more preferably about 20 to about 60% by weight (inclusive of at least about 20% by weight of at least one of fatty acids of drying oil and semidrying oil and these oils), based on the total weight of the polybasic acid, polyhydric alcohol, amine compound and fatty acid. In this case, the three components to be used other than the fatty acid are used in equal amounts in the aforesaid proportions in the invention.

It is possible to incorporate a dryer into the coating composition of the invention containing as the vehicle component the nitrogen-containing alkyd resin having as the essential component at least one of fatty acids of drying oil and semidrying oil and these oils in order to promote the oxidation or polymerization and to accelerate curing. Examples of useful dryers include conventional ones such as salts of metals with acids, examples of metals being cobalt, lead, manganese, calcium, zinc, iron, zirconium, cerium, copper, etc. and examples of acids being naphthenic acid, fatty acid of linseed oil, rosin, diethylhexanoic acid, octylic acid, etc. Among them, preferable are metal salts of naphthenic acids such as cobalt naphthenate, lead naphthenate, manganese naphthenate, calcium naphthenate, zinc naphthenate, etc. The amount of the dryer to be used is about 0.001 to about 5 parts by weight, preferably about 0.01 to about 2.0 parts by weight, calculated as the metal, per 100 parts by weight of at least one of fatty acids of drying or semidrying oil and these oils to be incorporated into the alkyd resin.

The coating composition of the invention is a liquid composition prepared using an organic solvent and/or water as a dissolving or dispersing medium. The coating composition of the organic solvent type can be prepared by dissolving or dispersing the foregoing resin in a usual organic solvent for coating compositions. Examples of useful organic solvents are hydrocarbons such as toluene, xylene, naphtha, mineral spirit, octane and cyclohexane, alcohols such as methanol, ethanol, butanol, cyclohexanol and heptanol, ethers such as dioxane, methyl cellosolve, butyl cellosolve, methylcarbitol and butylcarbitol, esters such as ethyl acetate, butyl acetate, methyl cellosolve acetate, cellosolve acetate and carbitol acetate, ketones such as methyl ethyl ketone, methyl isobutyl ketone, cyclohexanone and isophorone, etc. The aqueous coating composition can be prepared by neutralizing the nitrogen-containing alkyd resin with a basic substance and dissolving or dispersing the neutralized resin in water (which may contain an organic solvent). Examples of useful basic substances are ammonia, amine compounds such as trimethylamine, triethylamine, monoethanolamine, diethanolamine, triethanolamine, dimethylethanolamine, diethylethanolamine and morpholine, hydroxides such as caustic soda and caustic potash, etc.

The coating composition of this invention may have further incorporated therein known coloring pigments, extender pigments, metallic pigments, antisagging agents, curing promoting agents, etc.

The coating composition of the invention can be applied by brush coating, flow coating, air or airless spray coating, electrostatic coating, dip coating, curtain flow coating, electrodeposition, etc. The concentration of nonvolatile components of the composition to be applied can be in a wide range of about 5 to about 70% by weight. Suitably, the coating has a thickness of about 15 to about 40 μm when dried. The coating can be cured at room temperature or with heating. In case of heat-curing, the coating is heated to a temperature of about 40° to about 200° C. for about 10 to about 40 minutes. The substrates to be coated with the coating composition of the invention include those made of metals with a surface untreated or treated with a phosphate, chromate or the like, those coated with a primer, intercoat or topcoat and those made of plastics, wood, glass or the like.

The coating of nitrogen-containing alkyd resin coating composition according to the invention has a good adhesion to metals with the surface untreated or treated with a phosphate or the like and to plastics (especially polyamide resins) and is therefore applicable directly to such substrates without treatment with a primer or the like. Moreover, in case of multi-layer coating with the same coating composition (re-coating), the composition of the invention can be suitably applied as it is to form a multi-layer coating without resort to sanding. Further the coatings of coating composition of the invention satisfactorily adhere to primer coats, intercoats and top coats of other coating compositions and is usable in combination with other compositions for forming a multi-layer coating with substantially no adhesion failure occurring between layers. Moreover, the nitrogen-containing alkyd resin to be used in this invention is highly adsorbable to the surface of pigment particles and therefore enables easy dispersion of pigment with a high stability. Advantageously it is possible to disperse readily and thoroughly in the composition of the invention fine particles of carbon black, i.e. an acidic pigment which has been frequently difficult to disperse homogeneously and thoroughly. With this advantage, the coating composition of the invention can be stored virtually free of any coagulation or precipitation of pigment and can form coatings without any reduction in gloss and distinctness-of-image gloss even in use after a long period of storage. The resin of the invention also permits stable dispersion of other pigments, i.e. inorganic and organic pigments. Furthermore, the resin of the invention contributes to marked improvements in curability, solvent resistance, flexibility and the like. The nitrogen-containing alkyd resin to be used for the coating composition of the invention has nitrogen atoms incorporated into its main skeleton through the amide linkage as well as the ester linkage, so that the coatings of the coating composition of the invention are excellent in resistance to yellowing and are significantly improved in resistances to corrosion and chemicals such as acids, resistance to water and the like because of the stability of amide linkage to hydrolysis.

The present invention will be described below in greater detail with reference to Preparation Examples illustrating the preparation of nitrogen-containing alkyd resins for use in the invention, Examples and Comparison Example.

PREPARATION EXAMPLE 1

A mixture of 8.3 parts by weight of ethylene glycol, 6.0 parts by weight of methylpropanolamine, 18.8 parts by weight of pentaerythritol, 20.0 parts by weight of adipic acid, 27.8 parts by weight of isophthalic acid, 18.8 parts by weight of tall oil fatty acid and 3 parts by weight of xylene was reacted in a nitrogen atmosphere with stirring at 160° to 230° C. for about 12 hours. Consequently, 9.9 parts by weight of phthalic anhydride was reacted with the reaction mixture to effect addition by half-esterification to obtain a nitrogen-containing alkyd resin (A-1) for use in the invention. The resin (A-1) was found to be 64 in hydroxyl value, 45 in acid value and 6% by weight in amine compound content.

PREPARATION EXAMPLE 2

A mixture of 23.7 parts by weight of trimethylolpropane, 6.7 parts by weight of ethylethanolamine, 34.8 parts by weight of phthalic anhydride, 34.8 parts by weight of linseed oil fatty acid and 3 parts by weight of xylene was reacted in the same manner as in Preparation Example 1 to obtain a nitrogen-containing alkyd resin (A-2) for use in this invention. The resin (A-2) was found to be 55 in hydroxyl value, 10 in acid value and 6.7% by weight in amine compound content.

PREPARATION EXAMPLE 3

A mixture of 13.4 parts by weight of neopentyl glycol, 25 parts by weight of methylpropanolamine, 40.7 parts by weight of phthalic anhydride, 10.0 parts by weight of soybean oil fatty acid and 3 parts by weight of xylene was reacted in the same manner as in Preparation Example 1 to prepare a nitrogen-containing alkyd resin (A-3) for use in this invention. The resin (A-3) was found to be 200 in hydroxyl value, 3 in acid value and 28% by weight in amine compound content.

PREPARATION EXAMPLE 4

An alkyd resin for comparison was prepared in the same manner from the same composition as in Preparation Example 1 with the exception of using 7.1 parts by weight of diethanolamine in place of 6.0 parts by weight of methylpropanolamine. The resin was found to be 64 in hydroxyl value, 45 in acid value and 7% by weight in amine compound content.

PREPARATION EXAMPLE 5

A mixture of 18.0 parts by weight of neopentyl glycol, 23.8 parts by weight of trimethylolpropane, 38.7 parts by weight of phthalic anhydride, 19.5 parts by weight of soybean oil fatty acid and 3 parts by weight of xylene was reacted in the same manner as in Preparation Example 1 to prepare an alkyd resin for comparison.

EXAMPLE 1 AND COMPARISON EXAMPLE 1

The nitrogen-containing alkyd resin (A-1) prepared in Preparation Example 1 or the resin prepared for comparison in Preparation Example 4 was neutralized with diethylaminoethanol in amounts of 1.0 equivalent, giving an aqueous solution. To 100 parts by weight (calculated as solids) of the solution of neutralized resin (A-1) or resin for comparison were added 25 parts by weight (calculated as solids) of water-soluble, methanol-modified melamine resin (trade name "Sumimal M-30W," product of Sumitomo Chemical Co., Ltd., Japan), 125 parts by weight of titanium white pigment (trade name "JR-600E", product of Teikoku Kako Co., Ltd., Japan, the same hereinafter), butyl cellosolve and water. The mixture was treated by a ball mill for mixing and dispersion to obtain a composition-1 for the present invention (containing the nitrogen-containing alkyd resin prepared in Preparation Example 1) having a nonvolatile content of 50% by weight and a comparison coating composition-1 (containing the alkyd resin for comparison prepared in Preparation Example 4).

EXAMPLE 2

To 100 parts by weight (calculated as solids) of the nitrogen-containing alkyd resin (A-2) prepared in Preparation Example 2 were added 30 parts by weight (calculated as solids) of butoxylated melamine resin (trade name "UVAN 20SE," product of Mitsui Toatsu Chemicals, Inc., Japan), 20 parts by weight of precipitated barium sulfate, 125 parts by weight of titanium white pigment and solvents (butanol and xylene). The mixture was treated by a sand mill for mixing and dispersion to obtain a coating composition-2 for the invention having a nonvolatile content of 45% by weight.

EXAMPLE 3 AND COMPARISON EXAMPLE 2

To 100 parts by weight (calculated as solids) of the nitrogen-containing alkyd resin (A-3) of Preparation Example 3 or the resin for comparison of Preparation Example 5 were added 25 parts by weight (calculated as solids) of "UVAN 20SE", 125 parts by weight of titanium white pigment and solvents (isobutanol and xylene). The mixture was treated by a ball mill for mixing and dispersion to obtain a coating composition-3 for the invention having a nonvolatile content of 55% by weight (containing the nitrogen-containing alkyd resin of Preparation Example 3) as a product in Example 3 and a comparison coating composition-2 (containing the alkyd resin for comparison of Preparation Example 5) as a product in Comparison Example 2.

EXAMPLE 4

A coating composition-4 for the invention was prepared in the same manner as in Example 2 with the exception of using cobalt naphthenate (containing 0.5 part by weight of cobalt per 100 parts by weight of linseed oil fatty acid) serving as a dryer without use of butoxylated melamine resin serving as a crosslinking agent.

TEST RESULTS

The coating compositions-1 to -4 for the invention and comparison coating compositions 1 and 2 prepared in Examples and Comparison Examples were applied to iron panels surface-treated with iron phosphate and then cured with heating. The coated panels were tested for various properties of coating. Table 1 shows the results.

TABLE 1

| Coating composition | Examples | | | | Comparison Examples | |
|---|---|---|---|---|---|---|
| | 1 | 2 | 3 | 4 | 1 | 2 |
| Baking conditions | 140° C., 30 min | 130° C., 30 min | 140° C., 30 min | 20° C., 3 days | 140° C., 30 min | 140° C., 30 min |
| Thickness of cured coating (μm) | 30 | 35 | 25 | 25 | 30 | 25 |
| Appearance (*1) | A | A | A | A | A | A |
| Gloss (60°) | 95 | 92 | 96 | 88 | 94 | 89 |
| Gloss (20°) | 82 | 80 | 84 | 72 | 80 | 78 |
| Corrosion resistance (*2) | 1 mm | 0.5 mm | 1.5 mm | 2.5 mm | 3 mm | 5 mm< |
| Acid resistance (*3) | A | A | A | A | B | A |
| Alkali resistance (*4) | A | A | A | A | A | B |
| Flexibility (*5) | A | A | A | A | A | B |
| Pencil hardness | 2H | H | 2H | HB | 2H | HB |
| Solvent resistance (*6) | A | A | A | B | A | A |
| Adhesion (*7) | 100/100 | 100/100 | 100/100 | 100/100 | 100/100 | 40/100 |
| Recoating ability (*8) | 100/100 | 100/100 | 100/100 | 100/100 | 100/100 | 60/100 |
| Yellowing resistance (*9) | A | A | A | A | B | A |
| Storage properties (*10)  State after storage | A | A | A | A | A | A |
| Gloss (60°) | 94 | 91 | 95 | 85 | 88 | 69 |
| Gloss (20°) | 80 | 81 | 82 | 70 | 75 | 51 |

The marks (*1) to (*10) in Table 1 indicate the following.

(*1) Appearance: The coating surface was checked with the unaided eye for smoothness, cissing and pitting.

(*2) Corrosion resistance: A cross cut reaching the substrate was formed in the coating on the panel, which was then exposed to a salt spray for 480 hours. An adhesive cellophane tape was adhered to the cut portion and then peeled off. The length of the coating separated on either side of the cut was measured.

(*3) Acid resistance: Drops of N/10 aqueous solution of sulfuric acid were placed onto the coating on the panel as supported horizontally, the panel was then allowed to stand for 36 hours, and the coating surface was thereafter checked for changes. The mark A represents no change ocurring in the coating and the mark B shows that the coating blushed or became dull.

(*4) Alkali resistance: Determined by the same method as above in (*3) except that the acid solution was replaced by N/10 aqueous solution of caustic soda. The mark A indicates that the coating exhibited no change, and the mark B shows that the coating blushed or became dull.

(*5) Flexibility: The coated panel was bent to a radius of curvature of 6 mm with the coating out, and the coating was then checked for changes. The mark A shows that the coating was free from any change, while the mark B indicates that chipping or cracking ocurred.

(*6) Solvent resistance: The coated panel was immersed in toluene at 20° C. for 5 hours and then checked for changes. The mark A shows that the coating was free from any change and the mark B indicates that the coating surface reduced gloss.

(*7) Adhesion: The coated panel was immersed in water at 40° C. for 24 hours, then withdrawn and allowed to stand for 1 hours. Subsequently, the coating was cut crosswise in the same was as below in (*8) to check for adhesion.

(*8) Recoating ability: The aforementioned iron panel was coated with each coating composition to a thickness of 30 μm when cured, baked at 180° C. for 30 minutes, then further coated with the same composition to a thickness of 20 μm when cured and baked at 120° C. for 30 minutes.

Subsequently, the coating was cut crosswise to the substrate with a razor to form 100 squares, 1 mm × 1 mm. An adhesive cellophane tape was adhered to the coating surface and then peeled off. The number of remaining squares was counted.

(*9) Yellowing resistance: The coated panel was further heated at 180° C. for 60 minutes (the coated panel was heated at 140° C. for 60 minutes in Example 4). Then for comparative purpose, the heated panel and unheated panel were visually inspected for yellowing. The mark A indicates that the coating exhibited no change, while the mark B displays that yellowing of the coating was detected.

(*10) Storage properties: Each coating composition was stored at 40° C. for 20 days and checked for the sedimentation of the pigment. The mark A shows that the composition exhibited no change, while the mark B represents the occurrence of pigment sedimentation.

I claim:

1. A nitrogen-containing alkyd resin coating composition comprising (A) a nitrogen-containing alkyd resin having a hydroxyl value of about 30 to about 200, the resin being prepared by reacting an amine compound represented by the formula $$HO-C_nH_{2n}-NH-R_7$$

wherein $R_7$ is an alkyl group or a cycloalkyl group, and n is an integer of 1 to 4 with a polyhydric alcohol and a polybasic acid using or without using a fatty acid, and (B) an amino resin serving as a crosslinking agent.

2. A coating composition according to claim 1 which comprises about 95 to about 60% by weight of (A) nitrogen-containing alkyd resin and about 5 to about 40% by weight of (B) crosslinking agent, based on the combined weight of these two components.

3. A substrate coated with the coating composition as defined in claim 1.

* * * * *